March 4, 1952 R. E. BLETCHER ET AL 2,587,961
TRANSFER VALVE
Filed Oct. 6, 1947 2 SHEETS—SHEET 1
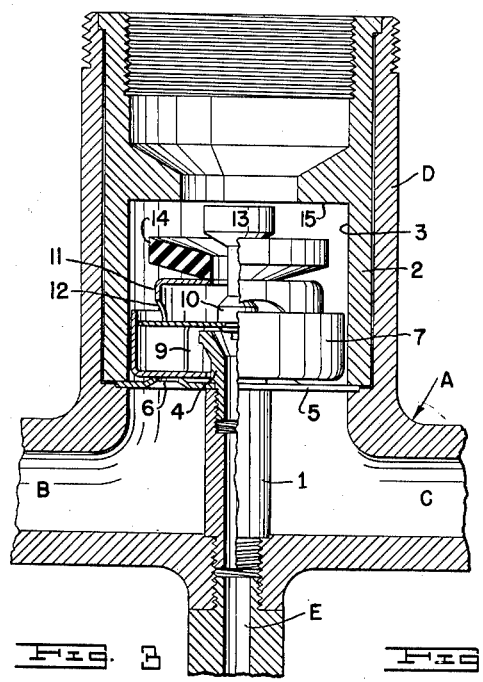
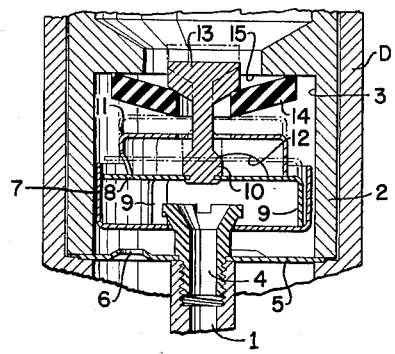
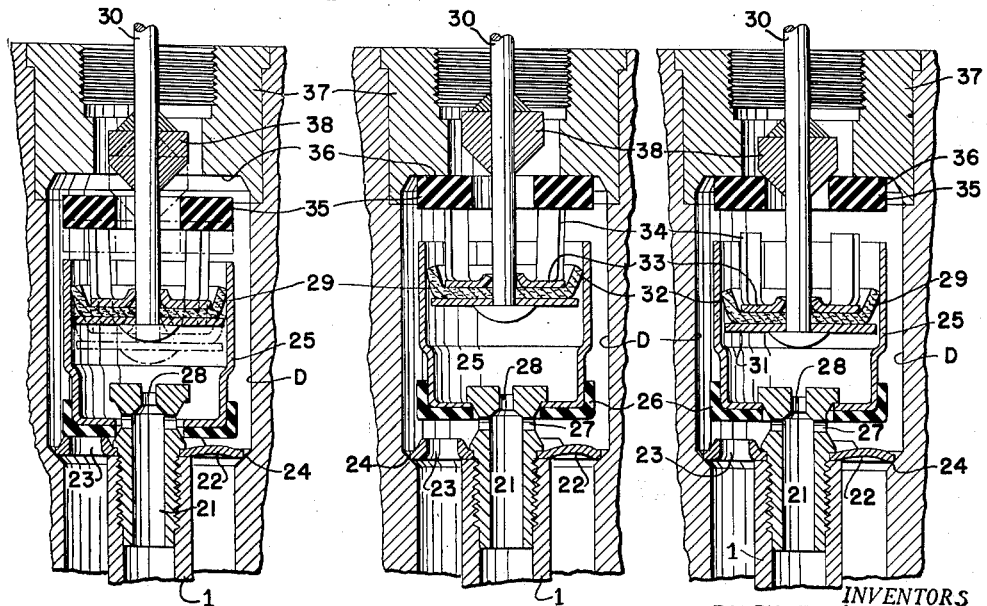
INVENTORS
RALPH E. BLETCHER
CLARENCE H. BENTLEY
BY IRVING A. WARD
Lyon & Lyon
ATTORNEYS March 4, 1952 R. E. BLETCHER ET AL 2,587,961
TRANSFER VALVE
Filed Oct. 6, 1947 2 SHEETS—SHEET 2
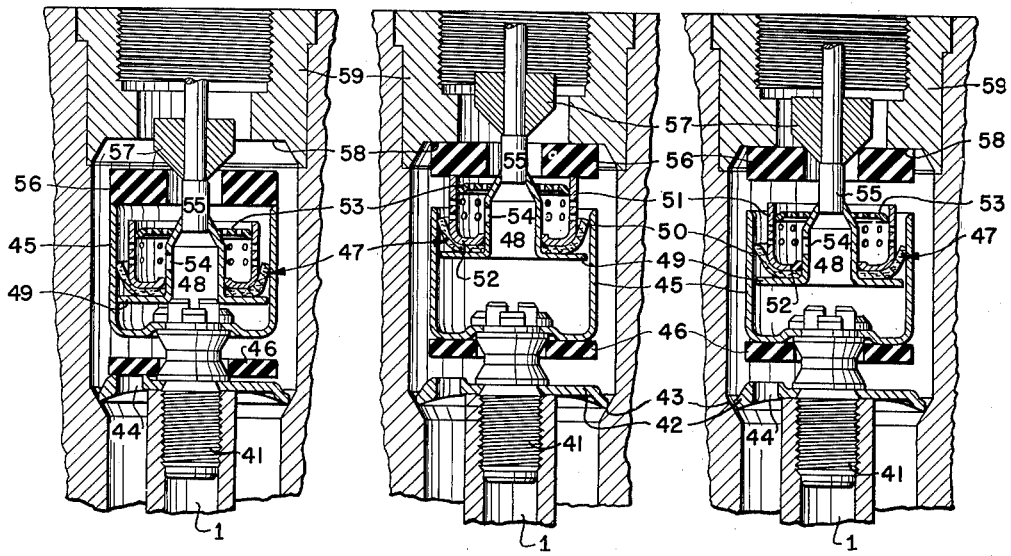
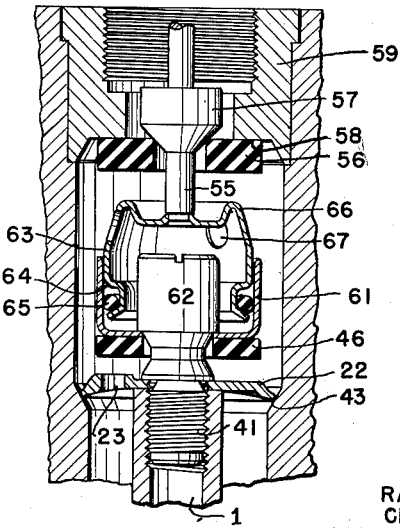
INVENTORS
RALPH E. BLETCHER
CLARENCE H. BENTLEY
BY IRVING A. WARD
*Lyon & Lyon*
ATTORNEYS Patented Mar. 4, 1952

2,587,961

UNITED STATES PATENT OFFICE 2,587,961

TRANSFER VALVE

Ralph E. Bletcher, Clarence H. Bentley, and Irving A. Ward, Los Angeles, Calif., assignors to Modern Faucet Mfg. Co., Los Angeles, Calif., a corporation of California Application October 6, 1947, Serial No. 778,055

22 Claims. (Cl. 277—61)

Our invention relates to transfer valves; that is, to valves adapted to be placed between a hot and cold water supply and a pair of outlets, one leading to a faucet spout, the other leading to a spray head, the valve being so arranged that water normally flows from the faucet spout but is diverted therefrom when the water is permitted to be discharged from the spray head.

Included in the objects of our invention are:

First, to provide a transfer valve which incorporates an anti-siphonic means: that is, a means whereby water is prevented from flowing backwards from the spray outlet into the water supply line should a vacuum condition occur therein, such anti-siphonic means being so arranged that it does not in any way interfere with the normal functions of the valve.

Second, to provide a transfer valve which is so designed that inexpensive metal stamps may comprise the major parts of the valves, other parts being arranged for economical manufacture by automatic screw machines, thereby providing a transfer valve which is particularly inexpensive of manufacture without detracting from its quality or dependability.

Third, to provide a transfer valve which, although performing the multiple functions of controlling the flow to a faucet spout or a spray head as well as preventing back flow, is particularly compact in design so as to fit into the limited space conventionally available in the region at which the faucet spout and spray hose are connected to the hot and cold water supply.

With the above and other objects in view, as may appear hereinafter, reference is directed to the accompanying drawings in which:

Figure 1 is a fragmentary sectional view of a plumbing fixture incorporating one form of our transfer valve, the transfer valve parts being shown in their normal position assumed when the water supply is cut off, this also being the position assumed when the valve is functioning to prevent back siphoning.

Figure 2 is a similar sectional view showing the parts of the transfer valve when the spray head is in operation, and indicating by dotted lines the position of the parts when the spout outlet is in operation and the spray outlet is closed.

Figure 3 is a sectional view similar to Figure 1 showing a modified form of our transfer valve, the valve being shown in its normal position when the supply is closed.

Figure 4 is a similar sectional view thereof showing the parts in the position assumed when water is flowing from the spout outlet.

Figure 5 is a similar sectional view showing the parts in the position assumed when water is flowing from the spray outlet.

Figure 6 is a sectional view, similar to Figures 1 and 3, showing a further modified form of our transfer valve in the position assumed when the water supply is cut off.

Figure 7 is a similar sectional view showing the valve in the position assumed when water is discharged from the spout outlet.

Figure 8 is a sectional view thereof showing the parts in the position assumed when water is discharged from the spray outlet.

Figure 9 is a sectional view, similar to Figure 8, showing a further modified form of our transfer valve.

Reference is first directed to the construction shown in Figures 1 and 2. In Figure 1, the transfer valve is shown mounted in a housing A having laterally directed supply passages B and C communicating with hot and cold water valves, not shown, and an upwardly directed spout outlet passage D. The housing is also provided with a spray supply outlet E which for convenience of manufacture is in axial alignment with the spout outlet D.

Mounted in the spray outlet E and projecting upwardly into the spout outlet passage D is a spray outlet stem 1. Fitted in the spout outlet passage D is a sleeve 2. The lower end of the sleeve 2 is counterbored as indicated by 3.

The upper end of the stem 1 is internally threaded and receives a tubular screw 4. A plate 5 having a central perforation receives the tubular screw 4 and is clamped by the screw over the end of the stem 1. The outer periphery of the plate 5 is clamped between a shoulder formed in the outlet passage D and the sleeve 2 therein. The plate 5 is provided with perforations 6 preferably formed in upwardly directed bosses so that the margins of the perforations form valve seats.

The tubular screw 4 is provided with an enlarged head and loosely mounted for movement between the head of the screw 4 and the plate 5 is a valve cup or cap 7, the base of which is adapted to seal directly against the margins of the perforations 6, or a sealing washer, not shown, may be interposed.

Loosely mounted within the valve cup 7 is an actuator disc 8 having depending legs 9 which space the actuator disc 8 from the bottom of the valve cup 7. The actuator disc is attached to a stem 10 which extends upwardly through a collar 11 having a depending notched skirt forming ports 12. The upper end of the stem 10 is provided with a head 13. Between the head 13 and the collar 11 there is mounted a floating valve ring 14. The sleeve 2 is provided with a shoulder 15 so located as to be sealingly engaged by the outer upper margin of the valve ring 14.

Operation of the transfer valve shown in Figures 1 and 2 is as follows:

When the water supply is closed, the parts assume the position shown in Figure 1. This is also the position assumed when a negative or reduced pressure exists in the supply passages. It will be thus observed that under such conditions the valve cup 7 seats against the margins of the perforations 6 and prevents back flow of fluids from either the spray head associated with the outlet stem 1 or the spout associated with the sleeve 2. Under these conditions there is open communication between the spout and the spray head.

When the water supply is turned on and the spray head is in operation, the parts assume the position shown by solid lines in Figure 2. Under these conditions water flows upwardly through the perforations 6, between the valve cup 7 and the sleeve 2, then downwardly over the upper rim of the valve cup 7, through a restricted area between the actuator disc 8 and the side walls of the valve cup and then out the tubular screw 4 and stem 1. The pressure differential across the actuator disc 8 holds the valve head 13 in its lower position and the water pressure existing above the actuator disc holds the floating valve ring 14 against the head 13 and the shoulder 15 so as to prevent flow to the spout. When flow through the outlet stem 1 is closed off, water pressure below the actuator 8 raises said actuator and raises the valve head 13 so that flow may occur through the central opening in the valve ring 14, around the head 13 and out the spout.

Reference is now directed to the construction shown in Figures 3, 4 and 5. As in the first described structure, a tubular screw 21 is fitted into the inner end of the stem 1 and clamps a valve plate 22 having valve ports 23 therein. In this construction the outer margin of the valve plate 22 is shown as bearing against a shoulder 24 formed within the outlet passage D of the housing A.

A cup member 25 is provided with a central perforation so as to fit loosely around the tubular screw 21, the head of the screw serving to limit upward movement of the cup 25. The base of the cup 25 may seat directly against the valve ports 23 as in the first described structure, or a valve seat disc 26 of yieldable material may be interposed. The tubular screw 21 is provided with lateral ports 27 adapted when the cup 25 is raised to communicate directly with the region above the valve plate 22. The screw 21 is also provided with an axially directing metering orifice 28 which communicates at all times with the interior of the cup member 25. The cup member 25 receives an actuator piston 29.

The actuator piston includes a washer 31, a cup-shaped sealing member 32 and a spacer 33. The sealing member 32 is clamped between the washer 31 and spacer 33, and is arranged to bear against the walls of the cup member 25. The spacer 33 is provided with upwardly directed spacer legs 34.

Mounted above the cup 25 and spacer 33 is a valve ring 35 which is adapted when forced upwardly to seat against a shoulder 36 provided at the inner end of a sleeve 37 corresponding to the sleeve 2 of the first described structure.

The stem 30 is equipped with a valve head 38 located within the sleeve 37 and adapted to seat within the valve ring 35.

Operation of the valve shown in Figures 3, 4 and 5 is as follows:

When the water supply is shut off, the valve parts are in the position shown by solid lines in Figure 3; that is, the disc 26 seats against the valve ports 23 in the valve plate 22 and the actuator piston 29 is in its lowermost position so that there is free communication between the valve chamber defined by the passage D between the valve plate 22 and the shoulder 36 preventing formation of a vacuum in the valve chamber and polluted water from being siphoned through the spray. This is also the condition which obtains should a negative pressure exist in the supply passage below the valve plate 22. If under such conditions there is a higher pressure in the spray outlet than in the spout outlet the excess pressure is dissipated around the sealing member 32 or through holes 27.

When the supply is open and the water is flowing from the spout outlet, the valve seat disc 26 is raised from the valve ports 23 and water flows around the cup member 25 inwardly between the legs 34 of the spacer 33, then upwardly through the central aperture in the valve ring 35 and around the valve head 38. This condition is attained when the spray outlet is closed and a back pressure exists under the actuator piston 29 by reason of the ports 27 and 28.

When the spray head is open and flow is permitted in the spray outlet, the condition shown in Figure 5 is obtained in which a reduced pressure exists below the actuator piston 29 due to the effect of the metering orifice 28. The actuator piston is thus forced downwardly by the pressure of the water above the actuator so that the valve head 38 fits in the valve ring 35. The valve ring 35 is held by water pressure upwardly against the shoulder 36 so that flow through the spout outlet is prevented.

Reference is now directed to the construction shown in Figures 6, 7 and 8.

In this construction, as in the previously described structure, a tubular screw 41 is threaded into the stem 1 and clamps a valve plate 42 against a shoulder 43 formed in the outlet passage D. The valve plate 42 is provided with valve ports 44.

Secured to the upper extremities of the tubular screw 41 is a cup member 45. Between the cup member 45 and the valve plate 42 is positioned a floating valve disc 46 adapted to seal the valve ports 44.

An actuator piston 47 is fitted within the cup member 45. The actuator piston includes a tubular core member 48 having a flange 49 adapted to support a cup-shaped sealing element 50. A cage member 51 having an internal flange 52 at its lower end is pressed downwardly over the core member 48 and clamps the sealing element 50. The upper end of the cage 51 is fitted with a perforated disc 53 through which protrudes the upper end of the core member 48. The cage, which is perforated, and the perforated disc 53 form a chamber surrounding the core member 48. A port 54 is provided in the core member so that water may bypass the piston and flow through the cage 51 and the core member 48.

Secured within the core member 48 is an upwardly directed stem 55 which projects through the perforated center of a ring valve 56 and is provided with a valve head 57. The ring valve 56 is adapted to float between the upper end of the cup 45 and a shoulder 58 provided in the sleeve 59 fitted within the outlet passage D.

Operation of the transfer valve shown in Figures 6, 7 and 8 is as follows:

The valve is normally in the position shown in Figure 6, which is, as in the previously described structures, the position assumed when negative pressures exist in the supply passage below the valve plate 42. Under such conditions the floating valve disc 46 closes the valve ports 44. The ring valve 56 is in its lower position so that the spout outlet is in communication with the chamber defined between the shoulder 58 and the valve plate 42.

When the supply is open and the spray outlet is closed, the condition shown in Figure 7 obtains. Under this condition the valve head 57 occuipes its upper position permitting flow through the aperture in the ring valve 56.

When the spray outlet is open the resistance to flow through port 54 establishes a pressure differential across the actuator piston 47 to move the actuator piston and valve head downwardly. The water pressure under the ring valve 56 urges this member upwardly so that communication with the spout outlet is closed.

The cage 51 and perforated disc 53 surrounding the port 54 serves to prevent any clogging of this port even though there should be a large quantity of solid matter in the water supply. It will be observed that the spray outlet is always in communication through the port 54 with the valve chamber defined between the valve plate 42 and shoulder 58 so that under the conditions shown in Figs. 6 or 7 any excess pressure in the spray head line is relieved through the port in the washer 56 controlled by the valve head 57.

It also will be observed that the cup 45 is sealed to the tubular screw 41 so that should the spray outlet contain contaminated water, the water level must reach a point above the cup 45 before it can possibly flow into the supply line should the valve disc 46 fail to function.

Reference is now directed to the construction shown in Figure 9. This construction is in many respects similar to the construction shown in Figures 6, 7 and 8 and common parts are given the same reference characters.

A cup member 61 is substituted for the cup 45 and the screw 41 is provided with an elongated head 62 terminating at approximately the upper extremity of the cup member 61. Secured to the valve stem 55 is an inverted cup 63 which telescopes within the cup 61. The lower extremity of the inverted cup 63 is provided with an external channel 64 which receives an O ring 65 adapted for sealing engagement with the walls of the cup member 61. The upper end of the inverted cup 63 is provided with a raised rim 66. Perforations 67 are provided in the side walls of the inverted cup adjacent its upper end. The structure shown in Figure 9 operates in the same manner as the structure shown in Figures 6, 7 and 8.

It is desirable that the intake to the spray outlet be as high as possible with respect to other parts of the transfer valve so as to facilitate installation of the transfer valve in a position whereby the intake end is higher than the spillover level of the sink with which it is associated. In the structure shown in Figure 9 it will be observed that the intake level, known as the "critical level," is the upper extremity of the screw head 62.

Having fully described our invention, it is to be understood that we do not wish to be limited to the details herein set forth, but our invention is of the full scope of the appended claims.

We claim:

1. In a transfer valve adapted for installation within a body defining a valve chamber having a spout outlet and a spray outlet in opposed relation, said spray outlet being within a tube, and an inlet to said chamber surrounding said tube, the combination of: a ported partition surrounding said tube and bridging said inlet; a check valve element movable to close the ports of said partition and prevent back flow from said valve chamber into said inlet; a control valve for said spout outlet; and means attached to said control valve responsive to a lower pressure in said spray outlet than in said valve chamber for causing said control valve to close said spout outlet.

2. In a transfer valve adapted for installation within a body defining a valve chamber having a spout outlet and a spray outlet in opposed relation, said spray outlet being within a tube, and an inlet to said chamber surrounding said tube, the combination of: a ported partition surrounding said tube and bridging said inlet; a check valve element movable to close the ports of said partition and prevent back flow from said valve chamber into said inlet; a control valve for said spout outlet; attached to said control valve responsive to a lower pressure in said spray outlet than in said valve chamber for causing said control valve to close said spout outlet; and pressure relief means for permitting back flow from said spray outlet to said chamber irrespective of the position of said control valve.

3. In a transfer valve adapted for installation within a body defining a valve chamber having a spout outlet and a spray outlet in opposed relation, said spray outlet being within a tube, and an inlet to said chamber surrounding said tube, the combination of: a ported partition surrounding said tube and bridging said inlet; a check valve element movable to close the ports of said partition and prevent back flow from said valve chamber into said inlet; means attached to said spray outlet and having a restricted communication between said valve chamber and said spray outlet, actuating means in said above mentioned means producing a reduced pressure below said actuating means during flow through said spray outlet; and a control valve for said spout outlet operatively connected with said actuating means to close said spout outlet during periods of flow through said spray outlet.

4. In a transfer valve adapted for installation within a body defining a valve chamber having a spout outlet and a spray outlet in opposed relation, said spray outlet being within a tube, and an inlet to said chamber surrounding said tube, the combination of: a ported partition surrounding said tube and bridging said inlet; a check valve element movable to close the ports of said partition and prevent back flow from said valve chamber into said inlet; means attached to said spray outlet and having a restricted communication between said valve chamber and said spray outlet, actuating means in said above mentioned means producing a reduced pressure below said actuating means during flow through said spray outlet; a control means for said spout outlet including a normally open floating ring valve for sealing engagement with said spout outlet when the pressure in said valve chamber is greater than at said spout outlet; and a valve head adapted to seat in said ring valve, said valve head being operatively connected with said actuating means to close flow to said spout outlet during periods of flow from said spray outlet.

5. In a transfer valve adapted for installation within a body defining a valve chamber having a spout outlet and a spray outlet in opposed relation, said spray outlet being within a tube, and an inlet to said chamber surrounding said tube, the combination of: a ported partition surrounding said tube and bridging said inlet; a tubular member continuing from said tube and securing said ported partition thereto; means restrained by said tubular member, said means defining a cup-shaped cavity within said valve chamber; an actuator forming a movable wall of said cavity, said cavity having restricted communication with said valve chamber whereby flow through said tubular member and spray outlet produces a reduced pressure in said cavity tending to move said actuator; a valve connected with said actuator for controlling said spout outlet; and means for closing the ports in said partition when the pressure in said valve chamber is greater than the pressure in said inlet.

6. In a transfer valve adapted for installation within a body defining a valve chamber having a spout outlet and a spray outlet in opposed relation, said spray outlet being within a tube, and an inlet to said chamber surrounding said tube, the combination of: a ported partition surrounding said tube and bridging said inlet; a tubular member continuing from said tube and securing said ported partition thereto; means restrained by said tubular member, said means defining a cup-shaped cavity within said valve chamber; an actuator forming a movable wall of said cavity, said cavity having restricted communication with said valve chamber whereby flow through said tubular member and spray outlet produces a reduced pressure in said cavity tending to move said actuator; and a control means for said spout outlet including a normally open floating ring valve for sealing engagement with said spout outlet when the pressure in said valve chamber is greater than at said spout outlet; and a valve head adapted to seat in said ring valve, said valve head being operatively connected with said actuator to close flow to said spout outlet during periods of flow from said spray outlet.

7. In a transfer valve adapted for installation withi na body defining a valve chamber having a spout outlet and a spray outlet in opposed relation, said spray outlet being within a tube, and an inlet to said chamber surrounding said tube, the combination of: means slidably mounted in and restrained by said tube said means defining a cup-shaped cavity surrounding said tube and located within said valve chamber; an actuator forming a movable wall of said cavity, said cavity having restricted communication with said valve chamber whereby flow through said tubular member and spray outlet produces a reduced pressure in said cavity; a valve connected with said actuator for closing said spout outlet when a reduced pressure exists in said cavity; and a check valve means for controlling said inlet to prevent back flow should the pressure within said inlet fall below the pressure in said valve chamber.

8. In a transfer valve adapted for installation within a body defining a valve chamber having a spout outlet and a spray outlet in opposed relation, said spray outlet being within a tube, and an inlet to said chamber surrounding said tube, the combination of: means slidably mounted on and restrained by said tube said means defining a cup-shaped cavity surrounding said tube and located within said valve chamber; an actuator forming a movable wall of said cavity, said cavity having restricted communication with said valve chamber whereby flow through said tubular member and spray outlet produces a reduced pressure in said cavity; a control means for said spout outlet including a normally open floating ring valve for sealing engagement with said spout outlet when the pressure in said valve chamber is greater than at said spout outlet, and a valve head adapted to seat in said ring valve, said valve head being operatively connected with said actuator to close flow to said spout outlet during periods of flow from said spray outlet; and a check valve means for controlling said inlet to prevent back flow should the pressure within said inlet fall below the pressure in said valve chamber.

9. In a transfer valve adapted for installation within a body defining a valve chamber having a spout outlet and a spray outlet in opposed relation, said spray outlet being within a tube, and an inlet to said chamber surrounding said tube, the combination of: a cup member reciprocable within said valve chamber, its interior in communication with the bore of said tube; an actuator reciprocable in said cup member; a restricted communication between said cup member and said valve chamber for establishing a low pressure zone in said cup member during flow through the tube forming said spray outlet; a control valve connected with said actuator and urged by said actuator to close said spout outlet during periods of flow through said spray outlet; and a check valve means incorporating said cup member for closing said inlet against back flow into said inlet.

10. In a transfer valve adapted for installation within a body defining a valve chamber having a spout outlet and a spray outlet in opposed relation, said spray outlet being within a tube, and an inlet to said chamber surrounding said tube, the combination of: a cup member reciprocable within said valve chamber, its interior in communication with the bore of said tube; an actuator reciprocable in said cup member and defining therewith a restricted opening communicating between said valve chamber and said spray outlet thereby to produce a region of reduced pressure during flow through said spray outlet; a control valve connected with said actuator and urged by said actuator to close said spout outlet during periods of flow through said spray outlet; and a check valve means incorporating said cup member for closing said inlet against back flow into said inlet.

11. In a transfer valve adapted for installation within a body defining a valve chamber having a spout outlet and a spray outlet in opposed relation, said spray outlet being within a tube, and an inlet to said chamber surrounding said tube, the combination of: a ported partition surrounding said tube and bridging said inlet; a stem secured in said tube; a cup member perforated to receive said stem; an actuator piston reciprocable in said cup member; a control valve for said spout outlet connected with said actuator piston; said stem having ports for direct communication between said valve chamber and said spray outlet; and a metering orifice communicating between the interior of said cup member and said spray outlet to create during flow through said spray outlet a region of reduced pressure at one side of said actuator piston thereby to close said spout outlet control valve; and a check valve means incorporating said cup member for closing said ported partition against back flow into said inlet.

12. In a transfer valve adapted for installation within a body defining a valve chamber having a spout outlet and a spray outlet in opposed relation, said spray outlet being within a tube, and an inlet to said chamber surrounding said tube, the combination of: a ported partition surrounding said tube and bridging said inlet; a cup cylinder within said valve chamber and secured to said tube, its interior communicating with said spray outlet; an actuator piston reciprocable in said cup cylinder; means defining a restricted port communicating between the interior of said cup cylinder and said valve chamber to create a low pressure region during flow through said spray outlet; a control valve for said spout outlet connected with said actuator piston to close said outlet during flow through said spray outlet; and a check valve interposed between said cup cylinder and partition to close the ports therein against back flow into said inlet.

13. A transfer valve structure comprising: a pair of telescoping tubular members defining inlets at their telescoped ends and at their remote ends opposed outlets; a cup valve surrounding the smaller of said tubular members and movable to close the inlet of the larger of said telescoping member against back flow from either of said outlets; a valve seat formed within said larger telescoping member spaced from the inner end of said smaller telescoping member; a flexible ring valve sealingly engageable with said valve seat; a control valve adapted to seat in said ring valve; and an actuator connected with said control valve and movable in said cup valve in response to flow through said smaller telescoping member to close said control valve.

14. A transfer valve structure comprising: a pair of telescoping tubular members defining inlets at their telescoped ends and at their remote ends opposed outlets; a check valve surrounding the smaller telescoping member and arranged to close the inlet of the larger telescoping member against back flow from either of said outlets; a valve seat formed within said larger telescoping member; a flexible ring valve sealingly engageable with said valve seat; a control valve adapted to seat in said ring valve; and means attached to said control valve responsive to a reduced pressure in said smaller telescoping member for closing said control valve.

15. In a transfer valve adapted for installation within a body defining a valve chamber having a spout outlet and a spray outlet in opposed relation, said spray outlet being within a tube, and an inlet to said chamber surrounding said tube, the combination of: a resilient check valve element larger than and movable to overlie said inlet on each edge thereof and prevent back flow from said valve chamber into said inlet; a control valve for said spout outlet; and means attached to said control valve responsive to a lower pressure in said spray outlet than in said valve chamber for causing said control valve to close said spout outlet.

16. In a transfer valve adapted for installation within a body defining a valve chamber having a spout outlet and a spray outlet in opposed relation, said spray outlet being within a tube, and an inlet to said chamber surrounding said tube, the combination of: a resilient check valve element larger than and movable to overlie said inlet on each edge thereof and prevent back flow from said valve chamber into said inlet, a control valve for said spout outlet; and an actuating piston attached to said control valve responsive to a lower pressure in said spray outlet than in said valve chamber for causing said control valve to close said spout outlet.

17. In a transfer valve adapted for installation within a body defining a valve chamber having a spout outlet and a spray outlet in opposed relation, said spray outlet being within a tube, and an inlet to said chamber surrounding said tube, the combination of: a check valve element movable to close said inlet; means attached to said spray outlet and having a restricted communication between said valve chamber and said spray outlet, actuating means in said last mentioned means producing a reduced pressure below said actuating means during flow through said spray outlet; and a control valve for said spout outlet operatively connected with said actuating means to close said spout outlet during periods of flow through said spray outlet.

18. In a transfer valve adapted for installation within a body defining a valve chamber having a spout outlet and a spray outlet in opposed relation, said spray outlet being within a tube, and an inlet to said chamber surrounding said tube, the combination of: a check valve element movable to close said inlet and prevent back flow from said valve chamber into said inlet; a cup member attached to said spray outlet and having a restricted communication between said valve chamber and said spray outlet, actuating means in said cup member producing a reduced pressure below said actuating means during flow through said spray outlet; and a control valve for said spout outlet operatively connected with said actuating means to close said spout outlet during periods of flow through said spray outlet.

19. In a transfer valve adapted for installation within a body defining a valve chamber having a spout outlet and a spray outlet in opposed relation, said spray outlet being within a tube, and an inlet to said chamber surrounding said tube, the combination of: a check valve element movable to close said inlet and prevent back flow from said valve chamber into said inlet; a cup member attached to said spray outlet and having a restricted communication between said valve chamber and said spray outlet, an actuating piston in said cup member producing a reduced pressure below said actuating piston during flow through said spray outlet; and a control valve for said spout outlet operatively connected with said actuating piston to close said spout outlet during periods of flow through said spray outlet.

20. In a device for controlling the direction of flow of liquid in a combination fixture including a casing having a water inlet and two water outlets, the combination with said casing of an anti-backflow transfer valve adapted to be mounted within the casing and between the outlets comprising: transfer valve outlet means through which liquid may flow from said inlet through said outlet means to one of the casing outlets, floating valve means interposed between the water inlet and said transfer valve outlet means and operable to close said water inlet when the pressure within the inlet is less than the pressure within the casing, a valve closure member for the other of said casing outlets surrounding a movable valve means and cooperating therewith to close the second casing outlet when flow is passing from the water inlet through said transfer valve outlet means, and said valve closure member being operable when the pressure within the casing beyond the water inlet is less than the pressure within the casing in advance of the water inlet to open the second casing outlet so that backflow from the transfer valve outlet means through the water inlet is avoided.

21. In a device for controlling the direction of flow of liquid in a combination fixture including a casing having a water inlet and two water outlets, the combination with said casing of an anti-backflow transfer valve adapted to be mounted within the casing and between the outlets comprising: means defining a transfer valve inlet, transfer valve outlet means through which liquid may flow from said inlet through said outlet means to one of the casing outlets, floating valve means interposed between the transfer valve inlet and said transfer valve outlet means and operable to close said transfer valve inlet when the pressure within the inlet is less than the pressure within the casing, a valve closure member for the other of said casing outlets surrounding a movable valve means and cooperating therewith to close the second casing outlet when flow is passing from the transfer valve inlet through said transfer valve outlet means, and said valve closure member being operable when the pressure within the casing beyond the transfer valve inlet is less than the pressure within the casing in advance of the water inlet to open the second casing outlet so that backflow from the transfer valve outlet means through the water inlet in avoided.

22. In a device for controlling the direction of flow of liquid in a combination fixture including a casing having a water inlet and two water outlets, the combination with said casing of an anti-backflow transfer valve adapted to be mounted within the casing and between the outlets comprising: transfer valve outlet means through which liquid may flow from said inlet through said outlet means to one of the casing outlets, floating valve means interposed between the water inlet and said transfer valve outlet means and operable to close said water inlet when the pressure within the inlet is less than the pressure within the casing, a valve closure member for the other of said casing outlets having an aperture therein, movable valve means adapted to fit within said aperture, a cup member surrounding said transfer valve outlet means and permitting flow to said transfer valve outlet means; an actuating piston connected to said movable valve means and adapted to fit within said cup means, means for forming a restricted communication between said water inlet and said transfer valve outlet independent of the position of said actuating piston, flow through said last mentioned means producing a reduced pressure in said cup member and below said actuating piston whereby said movable valve means closes said aperture in said valve closure member preventing flow through said last mentioned casing outlet, and said valve closure member being operable when the pressure beyond the water inlet is less than the pressure within the casing in advance of the water inlet to open the second casing outlet so that backflow from the transfer valve outlet means through the water inlet is avoided.

RALPH E. BLETCHER.
CLARENCE H. BENTLEY.
IRVING A. WARD.

REFERENCES CITED

The following references are of record in the file of this patent:

UNITED STATES PATENTS

| Number | Name | Date |
| --- | --- | --- |
| 1,256,600 | Schossow | Feb. 19, 1918 |
| 2,172,345 | Bucknell | Sept. 12, 1939 |
| 2,314,071 | Bucknell | Mar. 16, 1943 |